United States Patent [19]
Bolotin et al.

[11] Patent Number: 5,939,611
[45] Date of Patent: Aug. 17, 1999

[54] METHOD AND SYSTEM FOR CALIBRATING A DEVICE HANDLER

[75] Inventors: Lev M. Bolotin, Kirkland; Jerry Metcalf, Woodinville, both of Wash.

[73] Assignee: Data I/O Corporation, Redmond, Wash.

[21] Appl. No.: 09/028,693

[22] Filed: Feb. 24, 1998

[51] Int. Cl.[6] .................................................. G05B 19/42
[52] U.S. Cl. ................................................................ 73/1.79
[58] Field of Search .................................... 73/1.01, 1.75, 73/1.79, 1.81

[56] References Cited

U.S. PATENT DOCUMENTS

| | | | |
|---|---|---|---|
| 4,794,648 | 12/1988 | Ayata et al. | 382/151 |
| 4,816,729 | 3/1989 | Carlson | 318/568.24 |
| 5,114,236 | 5/1992 | Matsugu et al. | 356/401 |
| 5,118,957 | 6/1992 | Kawashima et al. | 250/559.4 |

*Primary Examiner*—Max Noori
*Attorney, Agent, or Firm*—Seed and Berry LLP

[57] ABSTRACT

In a device handling system, a method for calibrating the position and orientation of a destination for the placement of the device is shown and described. The device is first placed at the destination and a position arm comprising a chuck is directed to engage the device. The system registers the calibration configuration, which corresponds to the position and orientation of the chuck when engaged with the device. The system then removes the device from the destination and determines the device position, which corresponds to the position and orientation of the device with respect to the chuck. Finally, the system calculates the position and orientation of the destination based on the registered calibration configuration and the device position.

12 Claims, 4 Drawing Sheets

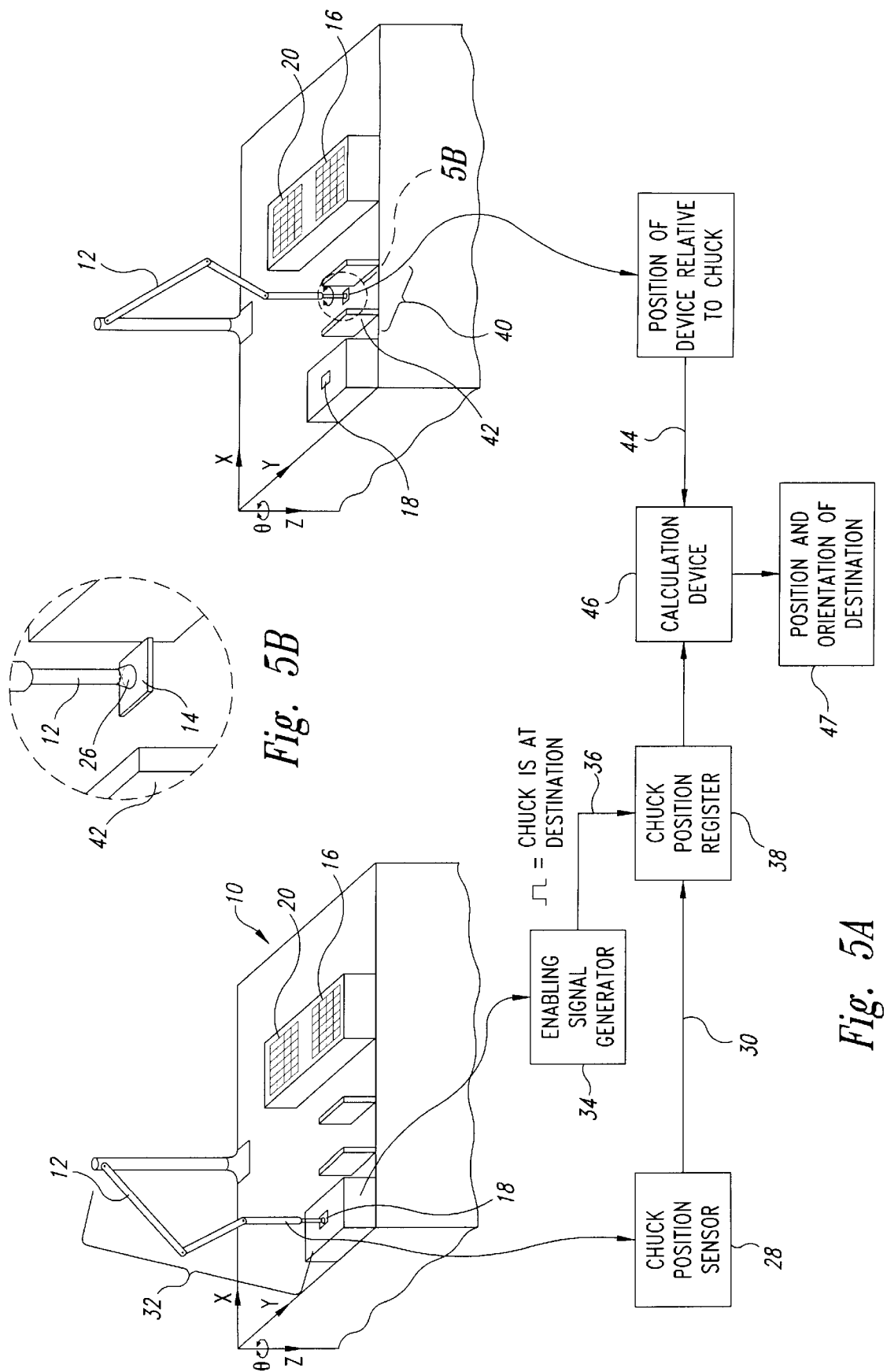

METHOD AND SYSTEM FOR CALIBRATING A DEVICE HANDLER

TECHNICAL FIELD

The invention is directed toward a calibration method and system and, more particularly, to a method and system for calibrating a device handler with respect to the location and orientation of a destination for the device.

BACKGROUND OF THE INVENTION

When manipulating integrated circuits and other electronic devices or parts, an automated device handler is commonly used to pick up the device at one location and place it at another location for processing, storage, etc. The handler comprises a positioning mechanism that is moved by an actuator. The positioning mechanism picks up the device with a chuck that may rotate about the vertical axis of the handler. A chuck position sensor provides a signal corresponding to the absolute position and orientation of the chuck at any given time. The rotation of the chuck combined with the movement of the positioning mechanism enables the handler to pick up and deliver a device to any location, in any orientation, within the working space of the handler.

FIGS. 1–4 are simplified schematic drawings illustrating the operations performed by a device handler 10 as commonly used in the semiconductor industry. With reference to FIGS. 1A and 1B, the handler 10 has a positioning mechanism 12 that is designed to move throughout the working area of the handler. The positioning mechanism 12 has a vacuum chuck 26 at one end that is adapted to engage and then pick up devices 14 such as integrated circuits.

During operation, the positioning mechanism 12 picks up the device 14 from a first storage location 16. As shown in FIG. 3, the positioning mechanism 12 then delivers the device 14 to a destination 18, where the device is processed. After processing, the positioning mechanism 12 picks up the device 14 and delivers it to a second storage location 20. Before the positioning mechanism 12 can place the device 14 in the proper orientation at the destination 18, the handler 10 must determine the location and orientation of both the device 14 and the destination 18.

To determine the location and orientation of the device 14, the handler 10 need only determine the position and orientation of the device 14 relative to the chuck 26 since the chuck position sensor provides an indication of the position and orientation of the chuck 26. With reference to FIG. 2, the handler 10 determines the position and orientation of the device 14 with respect to the chuck 26 by rotating the chuck 26 between the two panels 42 of a conventional laser alignment system 40. The laser alignment system 40 can be installed on the positioning mechanism 12, or it can be fixed to the handler 10. Once the handler 10 has determined the relationship between the chuck 26 and the device 14, the handler 10 can place the device 14 in the proper orientation at the destination 18 if the position and orientation of the destination 18 is known. However, at this point, the handler 10 does not know the exact position and orientation of the destination 18. In some instances, the destination 18 is in the same plane as the first and second locations, and therefore the handler 10 needs only calibrate the position and orientation of the destination 18 in two dimensions, i.e. the x-y plane. In other instances, the destination 18 is non-planar with the first and/or second location and, therefore, the device 10 must be calibrated in three dimensions.

As mentioned above, the device 14 is delivered to the destination 18 for processing. One type of processing that is performed on some devices 14 is programming the device 14. For example, the device 14 may be a programmable read only memory ("PROM") that must be programmed prior to use. In such cases, the destination 18 includes a set of terminals, such as a socket, that mate with contacts, such as pins, on the device 14. The proper positioning and alignment between the device 14 and the destination 18 is critical to establishing the proper electronic contact between the contacts on the device 14 and the terminals at the destination 18. In order for the positioning mechanism 12 to deliver the device 14 to the destination 18 in the proper orientation, the handler 10 must first be calibrated. The calibration method, which is the subject matter of the present invention, is discussed in detail below, as is the conventional technique for calibrating the handler 10 for the position and orientation of the destination 18.

After the device is processed, the positioning mechanism 12 picks up the device 14 and places it onto another vacuum chuck (not shown), or in some instances a vacuum pedestal (not shown), of a marking apparatus 54, where the device is labeled or marked. The location of the chuck on the marking apparatus can stored in the handler's memory or can be calibrated by the system and method of the present invention, as described below. Finally, the positioning mechanism 12 picks up the device 14 and places it at the second storage location 20.

As explained above, before the positioning mechanism 12 can place the device 14 at the destination 18, the handler 10 must be calibrated so that the location and orientation of the destination 18 is known. The location of the devices 14 in the first storage area 16 must also be known. However, it is only necessary to know the general location of the devices 14 in the first storage area 16 since the chuck 26 can engage virtually any portion of each device 14. Thus, the general location of the devices 14 at the first storage location 16 can be permanently recorded in memory (not shown) in the handler 10. Similarly, the tolerance for placing the devices 14 at the second storage location 20 is relatively broad, so this general location 20 can also be permanently stored in the handler's memory. These locations can also be calibrated by the method of the invention, which is discussed below.

The tolerance for placing the devices 14 at the destination 18 can be very small, such as when the device 14 is an integrated circuit having many small, closely spaced terminal pins that must plug into a socket at the destination 18. In such cases, the exact location and orientation of the destination 18 must be determined. Furthermore, if the destination 18 is part of a removable module, the position and orientation of the destination 18 can change each time the module is installed or otherwise moved. Because the tolerance for insertion of an integrated circuit into a programming socket is extremely low, the exact location and orientation of the destination 18 must be established each time the module is moved. To establish these variables, the exact position and orientation of the destination 18 must be determined in a calibration procedure.

FIG. 4 shows the position and orientation of the destination 18 being calibrated according to the prior art calibration procedure. A video camera 22 is attached to the positioning mechanism 12 in a known relationship with the chuck 26 (The video camera was omitted from FIGS. 1–3 for purposes of clarity). The positioning mechanism 12 is manipulated until the video camera 22 is aligned with a predetermined location and orientation at the destination 18. Because the spatial relationship between the chuck 26 and the video camera 22 is stored in the memory of the handler 10, the handler 10 is able to determine the position and orientation of the destination 18 in the x-y plane of the handler 10 based on the position and orientation of the chuck 26 at that time. Thus, the position and orientation of the destination 18 is determined from signals provided by the chuck position sensor and data from the handler's memory indicative of the position and orientation of the video camera 22 relative to the chuck 26.

The handler 10 is able to determine when the video camera 22 is aligned with the destination 18 by examining a video image created by the video camera 22. In particular, the positioning mechanism 12 is manipulated until predetermined points on the video image (such as cross hairs) overlie predetermined markings at the destination 18. The handler could then align the device above the destination, and lower the device until it engaged with the destination.

Because video calibration does not calibrate the exact position of the destination with respect to the handler's z-axis, the handler must be designed to "feel" when the positioning mechanism 12 engages with the destination 18, or must store data corresponding to the position of the destination 18 along the z-axis. Since the video camera 22 and associated components serve no purpose other than calibrating the destination 18, the entire cost of the video camera 22 and components are added costs to the handler 10.

A need therefore exists for an improved system and method for calibrating the exact location and orientation of a destination for a device.

SUMMARY OF THE INVENTION

A method and system according to one aspect of the invention calibrates a destination by initially placing a device in a predetermined position and orientation at the destination. The chuck then engages the device at the destination. Upon engaging the device with the chuck, an enabling signal is generated that instructs a chuck position register to store the position and orientation of the chuck. The stored information corresponds to the position of the chuck while the chuck is engaging the device at the destination.

The position and orientation of the device with respect to the chuck is then determined. In one embodiment of the prior art, a laser alignment system is used for this purpose. In a different prior art systems, a video camera is used. Both the video alignment system and the laser alignment system, as discussed above, define the position and orientation of the device with respect to the chuck. By combining the data from the chuck position register with the data from the laser alignment system, the handler is able to calculate the position and orientation of the device at the destination. Because the device was initially placed at a predetermined position and orientation at the destination, the calculated data also corresponds to the position and orientation of the destination. The handler thus calibrates the exact position and orientation of the destination so that devices can be subsequently placed at the destination.

As each device subsequently is picked up from an input storage tray, the location of that device with respect to the chuck is determined by the laser alignment system. From the calibration performed above, the position and orientation necessary for the chuck to properly place that particular device at the destination can be determined.

The calibration also allows the exact location of the destination to be determined along the z-axis. Consequently, there is no need for relying on the sense of touch or on recorded data points for proper placement of the device.

One potential advantage of the inventive method and system is that it may require little additional costs over that of the prior art handler system since the alignment device used for determining the position and orientation of the device with respect to the chuck is also used during calibration. Thus, there is no need for a video camera to calibrate the position and orientation of the destination.

BRIEF DESCRIPTION OF THE DRAWINGS

FIGS. 5A and 5B are a combination of two isometric views of a calibration system according to a first embodiment of the present invention, positioned above a block diagram of electronic components in the calibration system;

DETAILED DESCRIPTION OF THE INVENTION

Figure 1A:
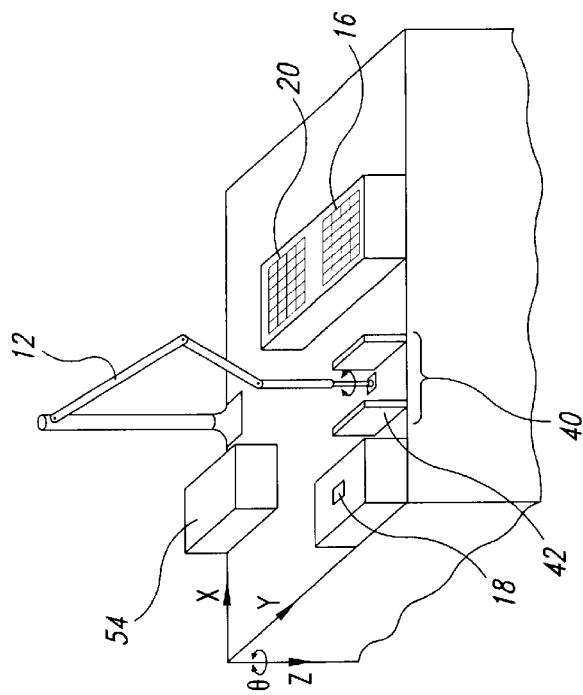
FIGS. 1A and 1B are isometric views of a device handler picking up a device out of a tray.
Figure 1B:
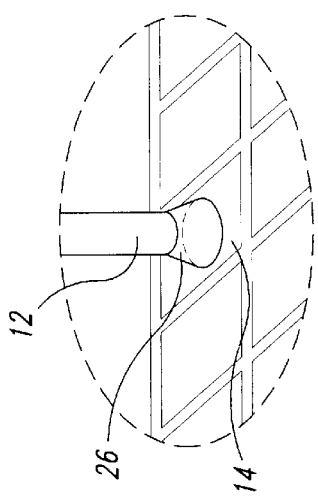
Figure 2:
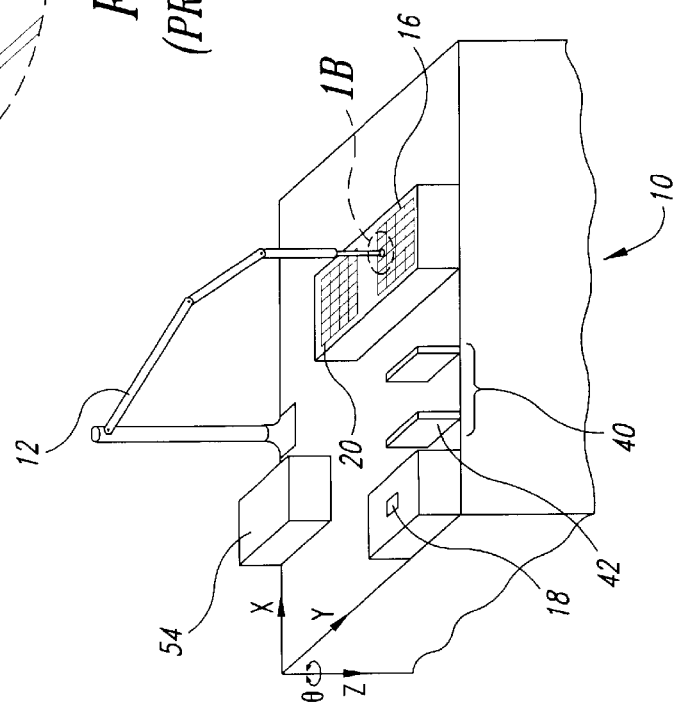
FIG. 2 is an isometric view of a handler rotating a device between the panels of an alignment system.
Figure 4:
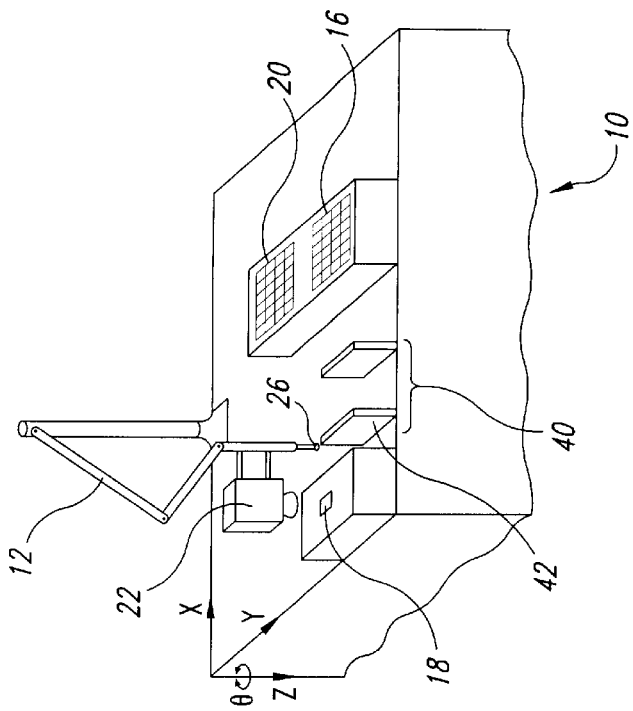
FIG. 4 is an isometric view of a handler using a video camera to calibrate the destination according to the prior art.
Figure 3:
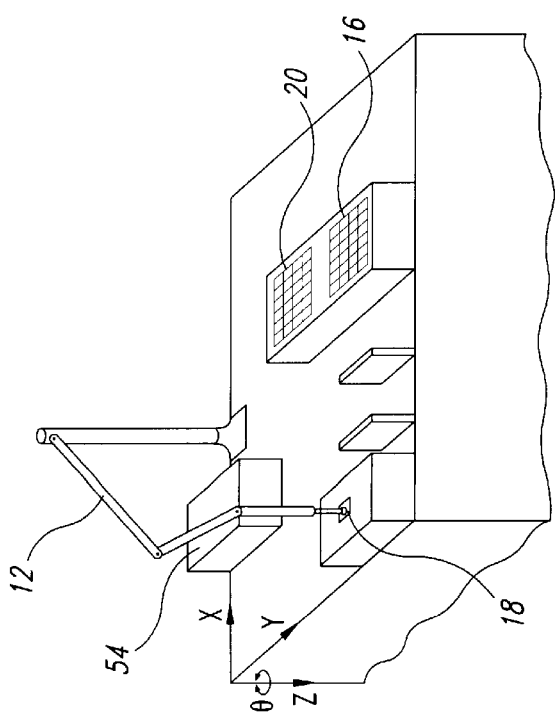
FIG. 3 is an isometric view of a handler placing a device at a destination.

FIGS. 5A and 5B show a system for calibrating the location and orientation of a destination 18 according to a first embodiment of the present invention. FIGS. 5A and 5B comprise two isometric views and a block diagram describing the electronic components of the handler 10 used for the calibration process. With reference to the isometric view on the left hand side of FIG. 5A, a device 14 (shown in FIG. 5B) is initially placed in the proper orientation at the destination 18. For example, where the device 14 is an integrated circuit having a plurality of contact pins, the pins of the integrated circuit are inserted into a socket mounted at the destination 18. The positioning mechanism 12, powered by an actuator 32, is moved such that the chuck 26 engages the device 14 at the destination 18. The positioning mechanism 12 can be moved manually, by manual controls, or automatically based on rough data point stored in the system's memory. The handler 10 is now in the calibration configuration.

The handler 10 has a chuck position sensor 28 that generates a chuck position signal 30. When the handler 10 is in the calibration configuration, an enable signal generator 34 sends an enable signal 36 to a chuck position register 38, which records the chuck position signal 30. The chuck position signal 30 that is stored in the chuck position register 38 corresponds to the location and orientation of the chuck 26 when the handler 10 is in the calibration configuration. This corresponds to the position and orientation necessary for the chuck 26 to properly engage this particular device 14 at the destination 18. To determine the position and orientation of the device 14 when the handler 10 was in the calibration configuration, the chuck position signal 30 stored in the chuck position register 38 must be adjusted to compensate for any offset between the chuck 26 and the device 14.

As described above and shown in the drawing at the right hand side of FIG. 5, the alignment system 40 determines the position and orientation of the device 14 with respect to the chuck 26. The input from the alignment system 40 and the stored signal in the chuck position register 38 are sent to a calculator 46 that determines the absolute position and orientation of the device 14 when the device was at the predetermined position and orientation at the destination 18. The calculator 40 thus outputs data 47 corresponding to the actual position and orientation of the destination 18.

As the handler 10 picks up subsequent devices 14, the handler first determines the position and orientation of each device 14 with respect to the chuck 26. The handler 10 can then place that device 14 in the proper location and orientation at the destination 18 based on the data 47 indicative of the position and orientation of the destination 18.

Figure 6:
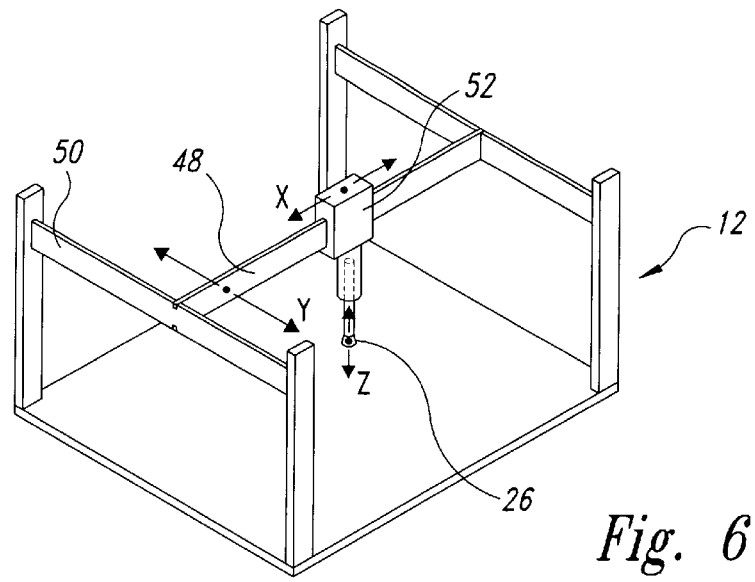
FIG. 6 is an isometric view of a calibration system according to a second embodiment of the present invention.

FIG. 6 shows a simplified schematic illustrating the positioning mechanism 12 according to a second embodiment of the present invention. The positioning mechanism 12 comprises a carriage 52, which moves with respect to the handler's x-axis, and a gantry 48, which moves along rails 50 with respect to the handler's y-axis. The chuck 26, attached to the carriage, translates with respect to the z-axis and rotates about the z-axis. These movements combine to allow the chuck 26 to access any location in the working area.

Figure 7:
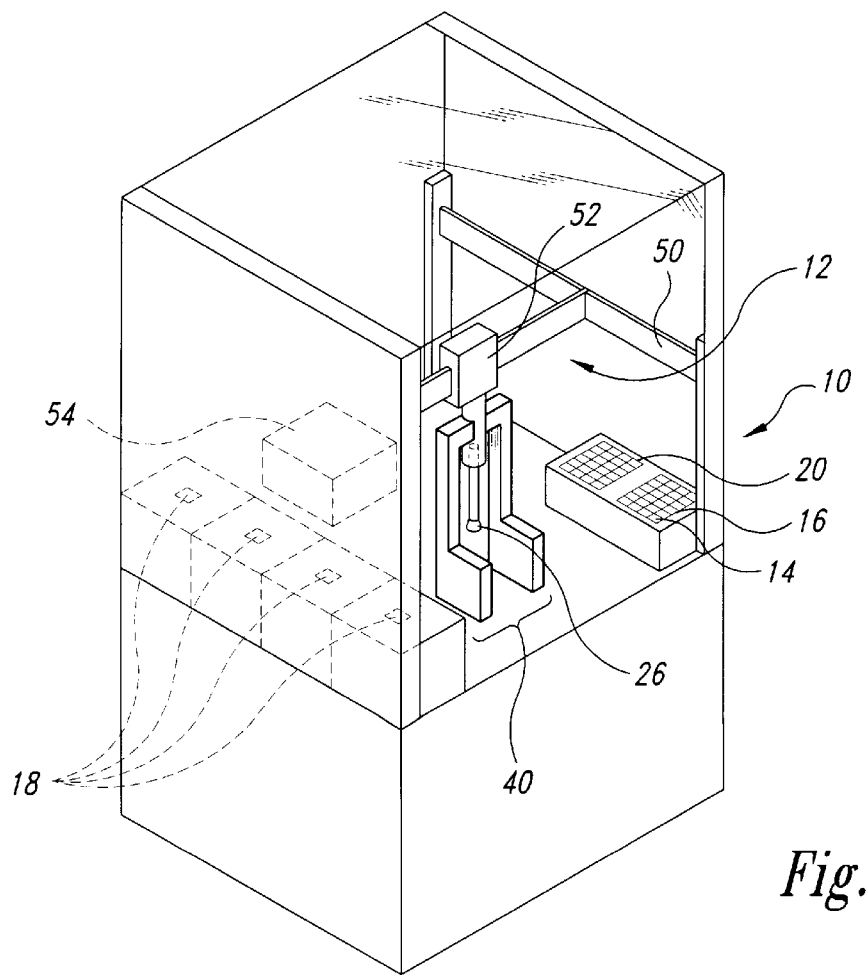
FIG. 7 is an isometric view of a calibration system according to a second embodiment of the present invention.

FIG. 7 shows a commercially realistic handler 10 according to a third embodiment of the present invention. The positioning mechanism 12 is equivalent to that shown in FIG. 6 and described above. In this embodiment, the handler 10 comprises a plurality of modular destinations 18 where a number of devices 14 are simultaneously processed.

A plurality of unmarked devices 14 are stored in the first storage location 16 prior to delivery to a destination 18. Each destination 18 has a distinct location and orientation and, because the destinations are designed as removable modules, the exact location and orientation of each destination 18 are unknown. Consequently, each destination 18 must be separately calibrated. To do so, one device 14 is initially placed at each destination 18 in the proper position and orientation to establish an electrical contact.

For each destination, the positioning mechanism 12 is first moved such that the chuck 26 engages the device 14 at the destination 18. At this point, the handler 10 is in the calibration configuration 32 corresponding to that particular destination. For each calibration configuration, the enable signal generator 34 sends an enable signal 36 causing the chuck position register 38 to record the chuck position signal 30 that corresponds to the position and orientation of the chuck 26 at that destination 18. The chuck position register 38 thus records distinct signals corresponding to the distinct positions and orientations of the chuck 26 corresponding to each of the destinations 18. The handler 10 then uses the alignment system 40 to adjust each of these signals to compensate for any offset between the chuck 26 and the device 14.

As each device 14 is removed from the destination 14 being calibrated, the alignment system 40 determines the offset between the chuck 26 and the device 14. The input from the alignment system 40 is sent to the calculator 46 along with the signal stored in the register 38 corresponding to that destination 18. The handler thus outputs data 47 corresponding to the actual position and orientation of each destination 18.

In the exemplary embodiment, the alignment system 40 is attached to the carriage 52. This allows the handler 10 to determine the position and orientation of each device 14 with respect to the chuck while at the same time delivering the device 14 to a particular location.

During operation, the handler 10 sequentially removes devices 14 from the first storage location 16 and places the devices 14 at an available destination 18. To do so, the alignment system 40 first determines the offset of each device 14 with respect to the chuck 26. The positioning mechanism 12 then places the devices 14 into one of the destinations 18 based on the data 47 associated with the position and orientation of that destination and the offset of that device 14 as determined by the alignment system 40.

As one or more devices 14 are being processed, the previously processed devices 14 are delivered to a marking apparatus 54, where the devices are identified. Finally, the devices 14 are delivered from the marking apparatus 54 to the second storage location 20. As devices 14 are moved from the destinations 18, blank devices 14 are delivered from the first storage location 16 to available destinations 18.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A system for calibrating the position and orientation of a destination for the placement of a device, the system comprising:

a positioning mechanism;

a chuck connected to the positioning mechanism, the chuck being constructed to engage the device;

an actuator coupled to the positioning mechanism, the actuator being constructed to cause the chuck to move between a plurality of positions including a calibration configuration where the chuck engages one of the devices when the device is located in a predetermined position and orientation at the destination;

a position sensor operable to determine the position and orientation of the chuck, the position sensor generating a chuck position signal corresponding thereto;

a register coupled to the position sensor, the register being operable to store the chuck position signal responsive to an enable signal;

an enable signal generator coupled to the register, the enable signal generator being operable to generate the enable signal when the chuck is in the calibration configuration;

an alignment system operable to determine the position and orientation of the device with respect to the chuck after the chuck has removed the device from the destination, the alignment system being operable to generate a device position signal corresponding to the position and orientation of the device with respect to the chuck; and a calculator coupled to the register and to the alignment system, the calculator being operable to determine the position and orientation of the destination based on the chuck position signal stored in the register and the device position signal from the alignment system.

2. The system of claim 1 wherein the device comprises an integrated circuit.

3. The system of claim 1 wherein the destination comprises a programming socket.

4. The system of claim 1 wherein the alignment system comprises a laser alignment system.

5. The system of claim 1 wherein the destination is calibrated in three dimensions.

6. The system of claim 1 further comprising:

a plurality of destinations;

a plurality of calibration configurations corresponding to the positions where the chuck engages each of the devices when the devices are located at respective predetermined positions and orientations at the destinations;

a plurality of enable signal generators;

a register operable to store the chuck position signals responsive to a plurality of enable signals generated by the enable signal generators when the chuck is in each of the calibration configurations; and a calculator operable to determine the position and orientation of the destinations based on the chuck position signals stored in the register and the device position signal from the alignment system.

7. A method for calibrating the position and orientation of a destination for the placement of a device, the method comprising:

placing the device in a predetermined position and orientation at the destination;

directing a chuck to engage the device;

registering a calibration configuration corresponding to the position and orientation of the chuck when engaging the device;

directing the chuck to remove the device from the destination;

determining a device position corresponding to the position and orientation of the device with respect to the chuck; and determining the position and orientation of the destination based on the registered calibration configuration and the device position.

8. The method of claim 7 wherein the device comprises an integrated circuit.

9. The method of claim 7 wherein the destination for the device comprises a programming socket.

10. The method of claim 7 wherein the chuck is directed to the device manually.

11. The method of claim 7 wherein the chuck is directed to the device automatically.

12. The method of claim 7 wherein determining the position and orientation of the device with respect to the chuck is conducted by a laser alignment system.

\* \* \* \* \*